Oct. 7, 1941.                G. WALTER                2,258,526
                         ENGINE COOLING SYSTEM
                          Filed June 7, 1940           2 Sheets-Sheet 1
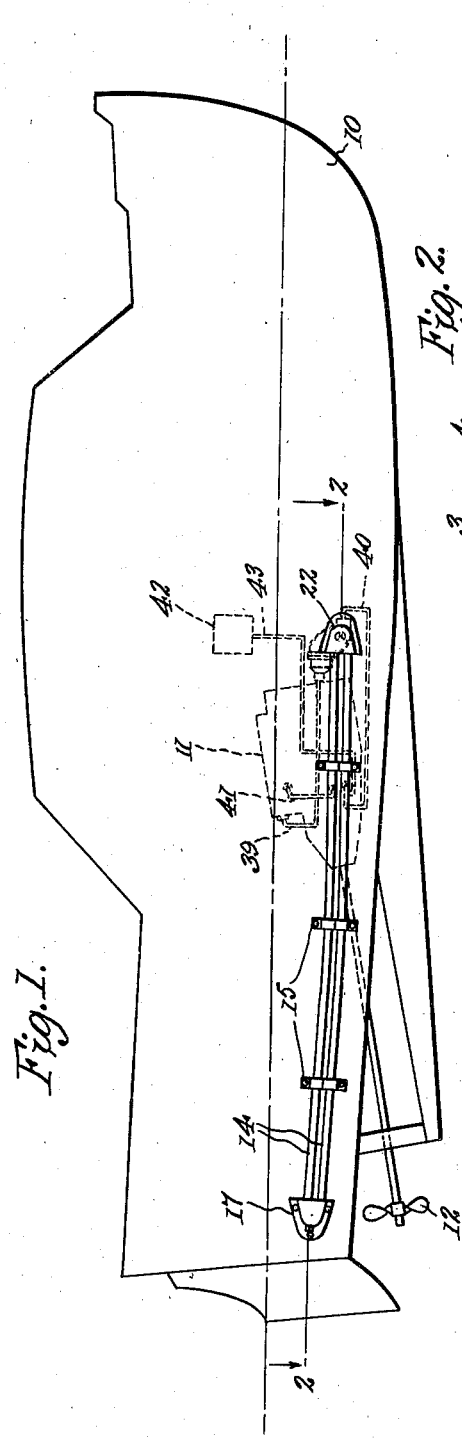
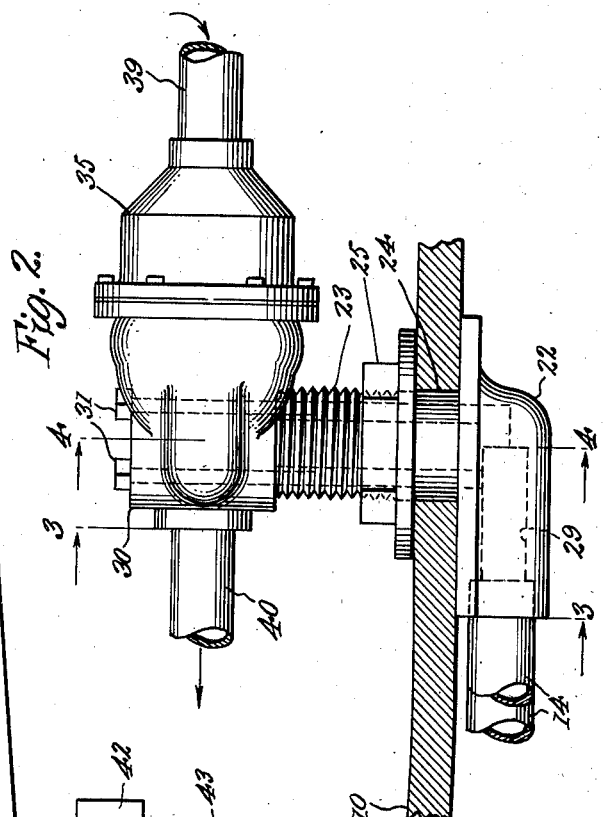
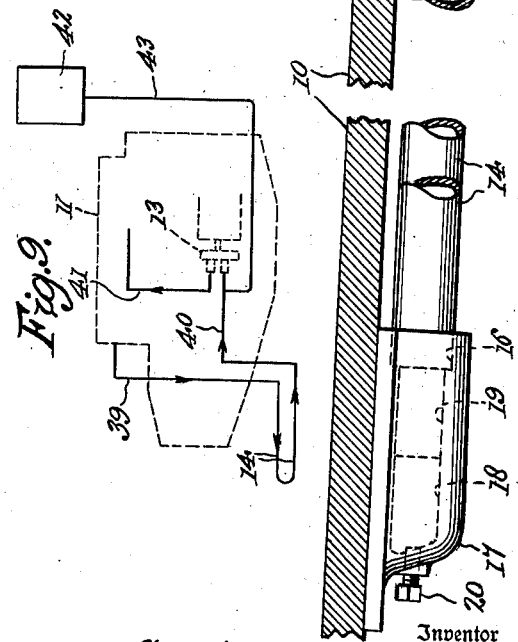
Inventor
Gustave Walter
By Mawhinney & Mawhinney
Attorneys.

Oct. 7, 1941.     G. WALTER     2,258,526
ENGINE COOLING SYSTEM
Filed June 7, 1940     2 Sheets-Sheet 2
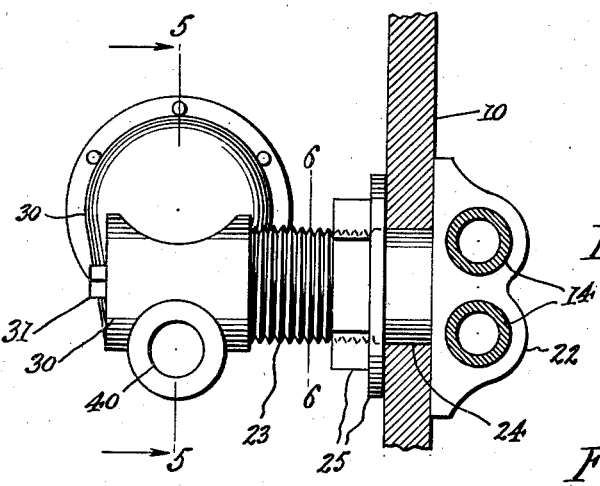
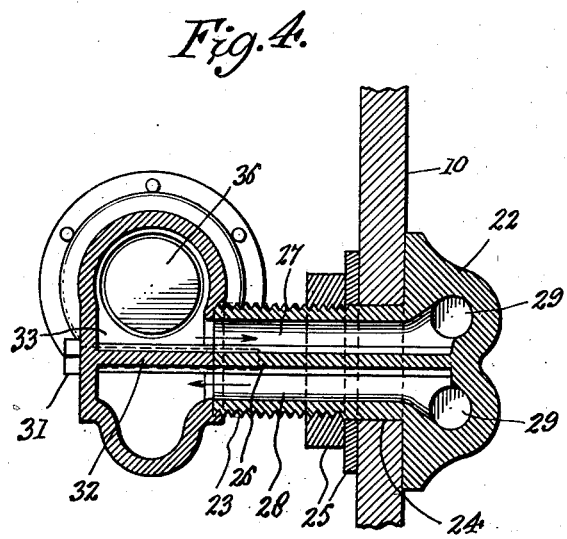
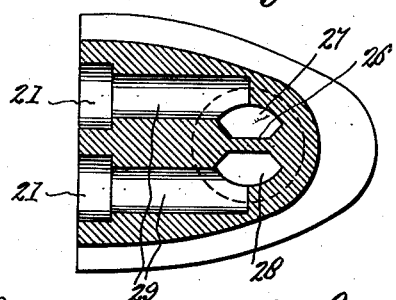
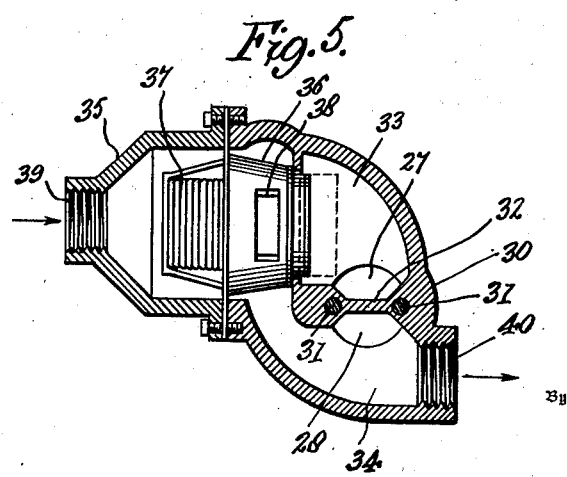
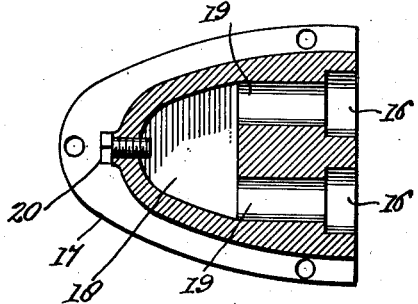
Inventor
Gustave Walter
Mawhinney & Mawhinney
Attorneys.

Patented Oct. 7, 1941

2,258,526

UNITED STATES PATENT OFFICE 2,258,526

ENGINE COOLING SYSTEM

Gustave Walter, Jersey City, N. J.

Application June 7, 1940, Serial No. 339,369

7 Claims. (Cl. 123—174)

The present invention relates to improvements in cooling systems for engines and more particularly for use with marine engines.

In the cooling systems usually employed with marine engines, water from outside of the hull supporting the engine is circulated through the cooling jacket of the engine and due to the presence of salt and various other impurities in the water, the engine has been subjected to severe damage from corrosion and deterioration of its parts.

An important object of the invention is to provide a cooling system for marine engines which will not be subject to the disadvantages above mentioned.

Another object of the invention is the provision of a cooling system for marine engines which will utilize the cooling capacity of the water outside of the hull without subjecting the engine parts to the deteriorating effects of such water.

A further object of the invention is the provision of a cooling system of this character which is simple and inexpensive and which is easily installed.

Other objects and advantages will be apparent during the course of the description that follows.

In the drawings, in which like parts are denoted by similar reference characters throughout the several views:

Figure 1 is a side elevation of a boat hull having the invention applied thereto.

Figure 2 is a fragmentary sectional view taken along the line 2—2 in Figure 1 illustrating the disposition of the cooling pipes and fittings.

Figure 3 is an elevation of the fitting for connecting the exterior cooling pipes of the system to the engine.

Figure 4 is a vertical sectional view taken along the line 4—4 in Figure 2.

Figure 5 is a sectional view taken on the line 5—5 of Figure 3 and looking in the direction of the arrows.

Figure 6 is a detail section taken on the line 6—6 of Figure 3.

Figure 7 is a longitudinal sectional view through the hull clamp terminal shown in Figures 3 and 4.

Figure 8 is a similar view of the other hull clamp terminal, and

Figure 9 is a diagrammatic illustration of the cooling system and engine.

Referring more particularly to the drawings, the numeral 10 designates the hull of a boat or the like having a conventional water jacketed engine 11 therein operatively connected to the propeller 12. The conventional engine cooling fluid circulating pump is schematically illustrated at 13. A pair of parallel spaced cooling pipes 14 are disposed longitudinally of the hull 10 below the water line and are secured to the exterior of said hull by suitable clamping bands 15 bolted to the hull. The rearward ends of the cooling pipes 14 fit snugly into recesses 16 in a hull clamp terminal 17 bolted or otherwise rigidly secured to the hull. A hollow chamber 18 in the clamp terminal 17 is connected with recesses 16 by means of bores 19 disposed in alignment with the cooling pipes 14. It will be seen that the clamp terminal 17 places the rearward end of one cooling pipe 14 in free communication with the rearward end of the other pipe 14. Access to chamber 18 is provided by a removable vent closing bolt 20 in the rear of terminal 17.

The forward ends of cooling pipes 14 are received in recesses 21 in a header terminal fitting 22 adapted to rest against the side of hull 10 and provided with a cylindrical pipe stem 23 extending at a right angle to the exterior portion of the terminal fitting 22 and adapted to pass through an opening 24 in the side of the hull. The exterior surface of the pipe stem 23 is screw threaded for the greater portion of its length to receive a washer and nut assembly 25 which is forced into intimate engagement with the interior of the hull to firmly clamp the terminal fitting 22 to the hull, as illustrated in Figures 3 and 4.

The bore of pipe fitting 23 extends down into the body of terminal fitting 22 and is divided longitudinally throughout its entire length by a central partition web 26 which forms an outlet duct 27 and an inlet duct 28 in pipe stem 23 and terminal 22. Bores 29 in the terminal fitting 22 connect ducts 27 and 28 with the recesses 21 and cooling pipes 14.

An inlet and outlet cap 30 is provided with a pair of bolts 31 which extend through the cap into threaded openings in pipe stem 23 to firmly secure the cap 30 to the open end of pipe stem 23. A web 32 divides the cap 30 into an inlet chamber 33 and an outlet chamber 34 and forms a continuation of the partition 26 of the pipe stem. The cap 30 is provided with a detachable inlet section 35 bolted to the inlet end of the cap and a by-pass valve 36 is disposed at the inlet end of the cap and operatively connected to a thermostat 37 which is accessible through the detachable cap section 35. By-pass valve 36 connects through its end with an inlet chamber 33 of the cap and through ports 38 in its side with the outlet chamber 34 of the cap. The thermostat 37 and by-pass valve 36 are of the usual construction and act to by-pass fluid entering section 35 into outlet chamber 34 until the temperature of the fluid actuates the thermostat and valve to close the by-pass ports and pass the fluid into the inlet chamber 33 of the cap and through ducts 27 and 29 to cooling pipes 14 from whence it returns through ducts 29 and 28 to outlet chamber 34 of the cap.

By reference to Figure 9, it will be seen that the cooling fluid is circulated from the engine manifold by conduit 39 to the inlet end of cap 30, through the outlet of cap 30 through conduit 40 to the circulating pump 13 of the engine and from the pump returns to the engine cooling jacket by conduit 41. An expansion tank 42 is connected to the conduit 40 by means of a conduit 43.

The various parts of the cooling system are formed of suitable corrosion resistant material such as copper and the joints are suitably sealed, as by solder.

The cooling system herein disclosed is a closed system, and while the low temperature of the water outside of hull 10 is utilized to cool the fluid in pipes 14, none of this water enters the system. Consequently corroding of parts of the engine will not result.

An important feature of the invention is the connection of the exterior cooling pipes 14 to the engine cooling jacket through the medium of a single two-way pipe stem 23 which requires but a single opening 24 in the hull 10. The cap 30 may be easily removed from the pipe stem 23 by removing bolts 31, and cap section 35 may be easily removed to gain access to the thermostat control and by-pass valve. As a consequence, the cooling pipes 14, terminals 17 and 22 and pipe stem 23 need not be removed once they are attached to the hull. The thermostat and by-pass valve permit efficient operation of the engine as the cooling pipes 14 will not be brought into operation until the temperature of the fluid from the engine cooling jacket is sufficient to require cooling of the fluid. When used in cold weather a suitable anti-freeze may be placed in the cooling system.

It is obvious that various changes and modifications may be made in the details of construction and design of the above specifically described embodiment of this invention without departing from the spirit thereof, such changes and modifications being restricted only by the scope of the following claims.

What is claimed is:

1. In a marine hull having an engine provided with a cooling jacket, a closed cooling system adapted for attachment to said hull comprising a cooling pipe secured to the exterior of said hull below its water line, inlet and outlet conduits connecting the engine cooling jacket with the exterior cooling pipe, means to circulate a cooling medium from said engine jacket through said conduits and exterior cooling pipe, a by-pass connecting said inlet and outlet conduits between the cooling pipe and engine jacket, and thermostatic means operatively associated with said by-pass to close and open the by-pass.

2. In a marine hull having an engine provided with a cooling jacket, a closed engine cooling system adapted for attachment to said hull comprising a cooling pipe coil secured to the exterior of said hull below its water line, an inlet and outlet pipe fitting connected to said exterior cooling pipe coil, an inlet and outlet cap secured to said pipe fitting, an inlet conduit connecting the inlet end of said cap to the engine cooling jacket, a return conduit connecting the outlet end of said cap to said cooling jacket, and means to circulate a cooling medium from said engine cooling jacket through the cap, pipe fitting and exterior cooling pipe coil.

3. In a marine hull having an engine provided with a cooling jacket, a closed engine cooling system adapted for attachment to said hull comprising a cooling pipe coil secured to the exterior of said hull below its water line, an inlet and outlet pipe fitting connected to said exterior cooling pipe coil, an inlet and outlet cap secured to said pipe fitting, an inlet conduit connecting the inlet end of said cap to the inlet end of the engine cooling jacket, a return conduit connecting the outlet end of said cap to said cooling jacket, means to circulate a cooling medium from said engine cooling jacket through the cap, pipe fitting and exterior cooling pipe coil, a by-pass connecting the inlet and outlet ends of said cap to shut off the pipe fitting and cooling pipe coil from the cooling system, and thermostatic means to close and open said by-pass.

4. In a marine hull having an engine provided with a cooling jacket, a closed engine cooling system adapted for attachment to said hull comprising a cooling pipe coil secured to the exterior of said hull below its water line, an inlet and outlet pipe fitting connected to said exterior cooling pipe coil, an inlet and outlet cap secured to said pipe fitting, an inlet conduit connecting the inlet end of said cap to the engine cooling jacket, a return conduit connecting the outlet end of said cap to said cooling jacket, means to circulate a cooling medium from said engine cooling jacket through the cap, pipe fitting and exterior cooling pipe coil, a by-pass connecting the inlet and outlet ends of said cap to shut off the pipe fitting and cooling pipe coil from the cooling system, thermostatic means to close and open said by-pass, and an expansion tank communicating with said return conduit.

5. In a marine hull having an inboard engine provided with a cooling jacket, a closed engine cooling system adapted for attachment to said hull comprising a cooling pipe coil secured to the exterior of said hull below its water line, a terminal header secured to the exterior of said hull and connected to the open ends of said cooling coil, a pipe stem carried by said terminal header, said pipe stem having its bore divided into inlet and outlet ducts communicating with opposite ends of the cooling pipe coil, said pipe stem passing through the wall of said hull to the interior thereof, a cap removably secured to the inner portion of said pipe stem and being divided into inlet and outlet chambers communicating with the inlet and outlet ducts respectively of said pipe stem, conducts connecting the inlet and outlet chambers of said cap with the engine cooling jacket, and means to circulate a cooling medium from said engine jacket through the conduits, cap, pipe stem and cooling pipe coil.

6. In a marine hull having an inboard engine provided with a cooling jacket, a closed engine cooling system adapted for attachment to said hull comprising a cooling pipe coil secured to the exterior of said hull below its water line, a terminal header secured to the exterior of said hull and connected to the open ends of said cooling coil, a pipe stem carried by said terminal header, said pipe stem having its bore divided into inlet and outlet ducts communicating with opposite ends of the cooling pipe coil, said pipe stem passing through the wall of said hull to the interior thereof, a cap removably secured to the inner portion of said pipe stem and being divided into inlet and outlet chambers communicating with the inlet and outlet ducts respectively of said pipe stem, conduits connecting the inlet and outlet chambers of said cap with the engine cooling jacket, means to circulate a cooling medium from said engine jacket through the conduits, cap, pipe stem and cooling pipe coil, a by-pass connecting the inlet of said cap with its outlet chamber, and thermostatic means operatively associated with said by-pass to close and open the by-pass, said thermostatic means being disposed in contact with the cooling medium entering said cap.

7. In a marine hull having an inboard engine provided with a cooling jacket, a closed engine cooling system adapted for attachment to said hull comprising a cooling pipe coil secured to the exterior of said hull below its water line, a terminal header secured to the exterior of said hull and connected to the open ends of said cooling coil, a pipe stem carried by said terminal header, said pipe stem being threaded and having its bore divided into inlet and outlet ducts communicating with opposite ends of the cooling pipe coil, said pipe stem passing through the wall of said hull to the interior thereof, fastening means cooperating with said threaded pipe stem within said hull for securing said terminal header to the hull, said pipe stem having sockets on its face portion, a cap having inlet and outlet chambers communicating with said inlet and outlet ducts of said pipe stem, said cap having bolts and bolt openings registering with the sockets on said pipe stem, said bolts extending through the cap and into the sockets of the pipe stem to removably secure said cap to the inner portion of said pipe stem, conduits connecting the inlet and outlet chambers of said cap with the engine cooling jacket, and means to circulate a cooling medium from said engine jacket through the conduits, cap, pipe stem and cooling pipe coil.

GUSTAVE WALTER.